United States Patent Office 2,702,162
Patented Feb. 15, 1955

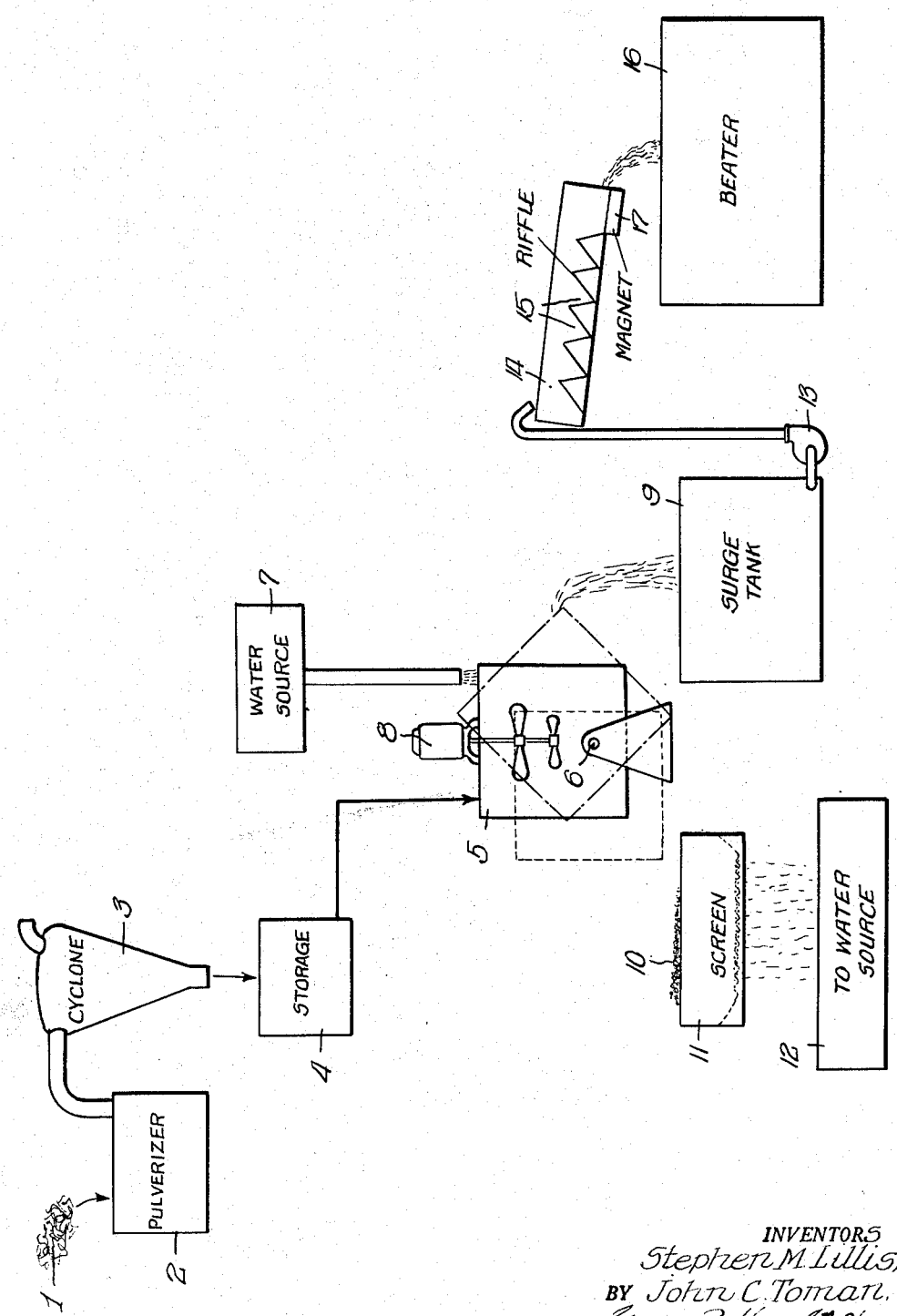

2,702,162

PROCESS OF RECOVERING TREATED FIBROUS MATERIAL

Stephen M. Lillis and John C. Toman, Chicago, Ill., assignors to Victor Manufacturing & Gasket Co., Chicago, Ill., a corporation of Illinois Application March 29, 1952, Serial No. 279,359

5 Claims. (Cl. 241—14)

This invention relates to a process of recovering treated asbestos fibers from waste gasket material and has for its principal object the provision of a new and improved process of this kind.

It is a main object of the invention to provide a process of recovering treated asbestos fibers from waste gasket material consisting of asbestos and metal.

Another object of the invention is to provide a method of recovering treated asbestos from waste gasket material which includes metal, and also to recover the metal in the material in a condition suitable for sale as scrap metal.

Another object of the invention is to provide a process for recovering treated asbestos fibers which can be carried out by apparatus that is inexpensive to construct, operate and maintain.

Another object of the invention is to provide a process of recovering treated asbestos fibers that can be carried out economically so as to recover the fibers at low cost.

Further objects of the invention not specifically mentioned here will be apparent from the detailed description and claims which follow, reference being had to the accompanying drawing in which the invention is diagrammatically illustrated.

Heat resistant gaskets, such as cylinder head gaskets, manifold gaskets and the like, are frequently manufactured with a metallic core, usually steel, containing a plurality of prongs bent out of the plane of the sheet in both directions and embedded in layers of asbestos board, forming a sandwich of thickness suitable for the purpose intended. In order to build desirable characteristics into the gasket, the asbestos board is frequently treated with materials which render it impervious to coolants, oils and the like, with which it comes in contact in use.

In the manufacture of a cylinder head gasket, for example, a rectangular sheet of the laminated stock of suitable dimensions is punched to form the gasket. Combustion openings, coolant openings, bolt holes and edgetrim materials form a substantial portion of the blank. In certain instances some of the large pieces of waste, such as the part removed to form the combustion chamber openings, may be used as a blank in the formation of a smaller gasket, such as for example a manifold gasket. Notwithstanding this, in the end from 30 to 35% of the laminated stock materials winds up as waste. Thus a substantial amount of treated asbestos fibers have been lost since heretofore there has been no method of recovering these fibers at a cost low enough to be economically feasible. In addition, the metallic waste, usually steel, has likewise been lost since the presence of the asbestos fiber in the waste rendered it unusable as scrap steel. Further, economic loss has been encountered by reason of the fact that at frequent intervals accumulations of this waste material had to be hauled away and dumped, the cost of this operation adding further to the loss.

The present invention provides a method whereby this waste material may be processed economically and the treated asbestos fibers, contained therein, recovered for further use, and in addition the metal in the waste is likewise recovered in a condition suitable for sale as scrap metal.

In carrying out the process of the present invention, the waste gasket material containing treated asbestos and metal is run through a suitable pulverizer which reduces it to a fine consistency and breaks or grinds up the metal into small bits. Quantities of the thus pulverized material are collected in suitable containers and thereafter dumped into a tank of water to form a slurry of consistency suitable for the purpose intended. This slurry is agitated briefly to separate the bits of metal from the fibers and at the end of this period of agitation the slurry is allowed to come to rest, with the result that the fibers rise to the top and the metal sinks to the bottom of the container. The container is then dumped to decant a portion of the water and the fibers from the remainder of the water and metal, and the metal then removed from the container and separated from the water and collected for sale as scrap.

The invention will best be understood by reference to the accompanying drawing in which it is diagrammatically illustrated. Scrap material 1 is fed into a pulverizer 2, the particular details of which form no essential part of the invention since there are a number of standard pulverizers available on the open market, all of which are suitable for use in the process. In these pulverizers the material is reduced to a fine consistency and removed from the pulverizer by an air stream and delivered to a cyclone 3 in which the pulverized material is separated from the air and falls into a storage receptacle 4. The receptacle 4 may be a bag, tote box, or similar device. The thus pulverized material is stored until it is required for use in the process.

In order to separate the bits of metal from the fibers, a quantity of the pulverized material is placed in a suitable vessel 5 which is preferably mounted on trunnions 6 so that it may be tipped in two directions. Water from a source 7 is also placed in the vessel in amounts sufficient to form a slurry containing from 8 to 12% solids. The mixture is agitated by an agitator that is driven by a source of power 8, for a time sufficiently long to facilitate separation of the metal from the fibers, but not long enough to saturate the fibers. The exact length of the period of agitation will depend upon the characteristics placed in the asbestos fibers by the treating materials employed.

Asbestos in its natural state has a specific gravity between 2.1 and 2.8. Treated asbestos, after it has been pulverized and blown out of the pulverizer in the manner described, has contained in it a substantial quantity of air, with the result that the pulverized fibers have an apparent specific gravity in the range of from .6 to .9. The materials with which the fibers have been treated to render them water repellent apparently aid in trapping air in the finely comminuted material. Furthermore, the treated material repels water and a considerable time and much agitation is required to saturate the fibers with water. These facts lend themselves to use in the process by permitting agitation of the slurry sufficiently to separate a major portion of the bits of metal from the fibers before the fibers have had a chance to absorb sufficient water to drive out the air bubbles entrained therein and thus return the material to a sepcific gravity heavier than water.

In practice it has been found that a moderately violent agitation of the slurry for a period of from two to five minutes is quite satisfactory, and that a three-minute period of agitation is most desirable. It will be noted that the length of the period of agitation will vary with variations in the composition of the materials with which the fibers are treated and that the times given above have been determined with a particular composition.

After the slurry has been thus agitated, the agitator is stopped and the slurry allowed to come to rest. The metal bits in the slurry gravitate to the bottom of the vessel and the fibers which still have an apparent specific gravity below that of water rise to the top of the vessel.

After the metal and fibers have thus been separated, the vessel 5 is turned on the trunnions, preferably by power means suitable therefor, to decant from the vessel the fibers and major portion of the water in the slurry, the materials thus removed from the vessel 5 being gathered in a storage tank 9 which serves as a surge tank.

The vessel 5 is then rotated on the trunnions 6 in a reverse direction and the bits of metal 10 and the remainder of the water are removed therefrom. Suitable implements, such as a hoe-like device, having a shape conforming to the contour of the vessel 5, may be employed to rake out the last remaining bits of metal from the vessel. The metal and water thus removed are dumped onto a screen device 11 which separates the water from the bits of metal 10, the water falling into a sump or reservoir 12 where it is collected for future use. The bits of metal 10 thus drained from the water are collected to be sold as scrap metal.

In the event that the surge tank 9 is located above the beater, the slurry of material in it can be delivered by gravity flow to the beater. In the event that the surge tank and beater are on the same or substantially the same level, a pump 13, preferably a centrifugal pump, may be used to deliver the slurry to a riffle 14 which contains a plurality of pockets 15 over which the slurry flows en route to the beater 16. Most of the small bits of metal still entrained in the slurry will gravitate out and be collected in the pockets 15 in the riffle. At the outer end of the riffle and located immediately beneath the floor thereof is a strong magnet 17 which attracts and holds any small bits of metal still in the slurry when it reaches this point. As a result, the treated asbestos fibers and water are delivered into the beater virtually completely free of metal, and any small bits of metal still remaining therein will be so small that their presence will not interfere with the operation of the beater or impair the quality of asbestos board made from the fibers.

The fibers thus delivered to the beater may form the entire solids part of a charge of slurry to be delivered to a board-forming machine or may form only a part thereof. Virgin asbestos fibers and treating materials and water may be added in the beater to form a slurry of consistency proper to meet the specifications of the board then being made.

From the foregoing it will be apparent that the process of the present invention permits recovery of usable treated asbestos fibers from waste material consisting of such material as asbestos fiber and metal, at a cost low enough to warrant operation of the process. It has been found that a recovery of fibers from the waste is virtually complete, test runs indicating that 90% or more of the fibers are recovered in condition for further use.

Throughout the foregoing description, treated asbestos fibers are specified. While the invention deals primarily with asbestos fibers, since the waste problem confronting us was primarily asbestos waste, the process of the present invention may be employed to recover fibers other than asbestos, and such use of the invention is contemplated.

While we have illustrated the invention by showing and describing a preferred form of the process, we have done so by way of example only, as there are many modifications and adaptations which can be made by one skilled in the art within the teachings of the invention.

Having thus complied with the statutes and shown and described a further embodiment of the invention, what we consider new and desire to have protected by Letters Patent is pointed out in the appended claims.

What is claimed is:

1. The method of recovering, for reuse, the metal and treated asbestos fibers from waste gasket material in which the asbestos is fixed to both faces of a sheet of metal, comprising: pulverizing the waste to grind the metal into small bits; aerating the waste to fluff the fibrous constituent thereof; adding water to the pulverized waste to form a slurry having from 88 to 92% water content; agitating the slurry moderately for a period long enough to free the fibers from the metal, but less than the time required to saturate the fibers; allowing the slurry to come to rest to permit the metal to fall to the bottom and the fibers to rise to the top; decanting the fibers and a part of the water from the metal and remainder of the water; separating the metal from the water; and passing the decanted water and fibers over a riffle and magnet to remove therefrom any metal entrained therein.

2. The method of recovering for reuse the metal and treated asbestos fibers from waste gasket material in which the asbestos is fixed to both faces of a sheet of metal, comprising: pulverizing the waste to grind the metal into small bits; aerating the waste to fluff the fibrous constituent thereof; adding water to the pulverized waste to form a slurry containing from 8 to 12% solids; agitating the slurry moderately for a time long enough to free the fibers from the metal, but less than the time required to saturate the fibers; allowing the slurry to come to rest to permit the metal to fall to the bottom and the fibers to rise to the top; decanting the fibers and a part of the water from the metal and remainder of the water; separating the metal from the water; and passing the decanted water and fibers over a riffle and magnet to remove therefrom any metal entrained therein.

3. The method of recovering for reuse the metal and treated asbestos fibers from waste gasket material in which the asbestos is fixed to both faces of a sheet of metal, comprising: pulverizing the scrap to grind the metal into small bits; aerating the waste to fluff the fibrous constituent thereof; adding water to the pulverized scrap to form a slurry having from 88 to 92% water content; agitating the slurry moderately for a time long enough to free the fibers from the metal, but less than the time required to saturate the waste; allowing the slurry to come to rest to permit the metal to fall to the bottom and the fibers to rise to the top; decanting the fibers and a part of the water from the metal and the remainder of the water; separating the metal from the water; and passing the decanted water and fibers over a riffle and magnet to remove therefrom any metal entrained therein.

4. The method of recovering for reuse the metal and treated asbestos fibers from waste gasket material in which the asbestos is fixed to both faces of a sheet of metal, comprising: pulverizing the waste to grind the metal into small bits; aerating the waste to fluff the fibrous constituent thereof; adding water to the pulverized waste to form a slurry containing from 88 to 92% water; agitating the slurry for a time long enough to free the fibers from the metal, but less than the time required for the fibers to become saturated with water; allowing the slurry to come to rest to permit the metal to fall to the bottom and the fibers to rise to the top; decanting the fibers and a part of the water from the metal and remainder of the water; separating the metal from the water; and passing the decanted water and fibers over a riffle and magnet to remove therefrom any metal entrained therein.

5. The method of recovering for reuse, the metal and treated asbestos fibers from waste gasket material in which the asbestos is fixed to both faces of a sheet of metal, comprising: pulverizing the waste to grind the metal into small bits; aerating the waste to fluff the fibrous constituent thereof and to entrap air therein; adding water to the pulverized waste to form a slurry having from 88 to 92% water content; agitating the slurry moderately for a period of from two to five minutes to free the fibers from the metal; allowing the slurry to come to rest to permit the metal to fall to the bottom and the fibers to rise to the top; decanting the fibers and part of the water from the metal and remainder of the water; separating the metal from the water; and passing the decanted water and fibers over a riffle and magnet to remove therefrom any metal entrained therein.

References Cited in the file of this patent

UNITED STATES PATENTS

| Number | Name | Date |
| --- | --- | --- |
| 553,091 | Woodward | Jan. 14, 1896 |
| 941,634 | Godley | Nov. 30, 1909 |
| 2,280,903 | Ellison | Apr. 28, 1942 |
| 2,386,713 | Pharo | Oct. 9, 1945 |
| 2,500,154 | Crockett | Mar. 14, 1950 |